United States Patent
Tang et al.

(10) Patent No.: US 11,126,971 B1
(45) Date of Patent: Sep. 21, 2021

(54) SYSTEMS AND METHODS FOR PRIVACY-PRESERVING ENABLEMENT OF CONNECTIONS WITHIN ORGANIZATIONS

(71) Applicant: JPMorgan Chase Bank, N.A., New York, NY (US)

(72) Inventors: John Tang, London (GB); Michael B. Solovay, New York, NY (US); Benjamin F. Sylvester, III, Darien, CT (US); Ashleigh Ann Thompson, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 1056 days.

(21) Appl. No.: 15/375,302

(22) Filed: Dec. 12, 2016

(51) Int. Cl.
*G06Q 10/00* (2012.01)
*G06Q 10/10* (2012.01)
*H04W 12/02* (2009.01)
*G06Q 50/00* (2012.01)

(52) U.S. Cl.
CPC ........ *G06Q 10/1095* (2013.01); *H04W 12/02* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 6,606,744 B1* | 8/2003 | Mikurak | ................ | H04L 29/06 717/174 |
| 7,512,612 B1* | 3/2009 | Akella | .................... | H04L 51/32 |
| 8,015,117 B1* | 9/2011 | Lillibridge | ........... | G06Q 20/382 705/64 |
| 8,185,558 B1* | 5/2012 | Narayanan | .......... | G06F 16/9024 707/798 |
| 8,244,848 B1* | 8/2012 | Narayanan | ............. | G06Q 50/01 709/218 |
| 8,738,634 B1* | 5/2014 | Roth | ....................... | H04L 51/22 707/748 |

(Continued)

OTHER PUBLICATIONS

Eric Gilbert (Predicting Tie Strength in a New Medium, School of Interactive Computing & GVU Center, Georgia Institute of Technology, Feb. 11-15, 2012, Seattle, WA)). (Year: 2012).*

(Continued)

*Primary Examiner* — Hafiz A Kassim
(74) *Attorney, Agent, or Firm* — Greenberg Traurig LLP

(57) ABSTRACT

Systems and methods for privacy-preserving enablement of connections within organizations are disclosed. In one embodiment, a method may include (1) receiving, at a server comprising a computer processor, an identification of a target to contact from a requester in an organization; (2) the computer processor identifying, in a connection database, at least one user within the organization having a connection with the target; (3) the computer processor communicating anonymized information representing the at least one user having the connection and a relationship-strength score for the connection; (4) the computer processor communicating a request for introduction assistance to the at least one user; (5) the computer processor receiving acceptance of the request for introductory assistance from the at least one user; and (6) the computer processor identifying the at least one that accepted the request to the requester.

7 Claims, 4 Drawing Sheets

(56) References Cited

U.S. PATENT DOCUMENTS

| | | | | |
|---|---|---|---|---|
| 10,034,135 | B1* | 7/2018 | Provost | H04W 4/025 |
| 2002/0087320 | A1* | 7/2002 | Lee | G10L 15/1822 |
| | | | | 704/270 |
| 2002/0099824 | A1* | 7/2002 | Bender | G06F 21/6254 |
| | | | | 709/225 |
| 2003/0158855 | A1* | 8/2003 | Farnham | G06F 3/0481 |
| 2004/0088362 | A1* | 5/2004 | Curbow | G06Q 10/109 |
| | | | | 709/207 |
| 2004/0122803 | A1* | 6/2004 | Dom | G06F 16/9535 |
| 2004/0122855 | A1* | 6/2004 | Ruvolo | G06Q 50/01 |
| 2004/0254894 | A1* | 12/2004 | Tsuei | G06Q 10/08 |
| | | | | 705/74 |
| 2005/0004983 | A1* | 1/2005 | Boyd | H04L 65/4038 |
| | | | | 709/204 |
| 2005/0065980 | A1* | 3/2005 | Hyatt | G06F 16/22 |
| 2006/0004869 | A1* | 1/2006 | Yuster | G06Q 30/00 |
| 2006/0242154 | A1* | 10/2006 | Rawat | G06F 16/168 |
| 2007/0067297 | A1* | 3/2007 | Kublickis | G06Q 20/29 |
| 2007/0124297 | A1* | 5/2007 | Toebes | G06F 16/951 |
| 2008/0015927 | A1* | 1/2008 | Ramirez | G06Q 10/06395 |
| | | | | 705/7.29 |
| 2008/0103800 | A1* | 5/2008 | Domenikos | G06Q 30/0185 |
| | | | | 705/318 |
| 2008/0140786 | A1* | 6/2008 | Tran | G06Q 10/10 |
| | | | | 709/206 |
| 2009/0063379 | A1* | 3/2009 | Kelly | G06Q 10/00 |
| | | | | 706/46 |
| 2009/0150238 | A1* | 6/2009 | Marsh | G06Q 30/02 |
| | | | | 705/307 |
| 2009/0228555 | A1* | 9/2009 | Joviak | G06Q 10/107 |
| | | | | 709/205 |
| 2009/0313346 | A1* | 12/2009 | Sood | G06Q 10/10 |
| | | | | 709/207 |
| 2009/0327434 | A1* | 12/2009 | Reynolds | G06Q 30/02 |
| | | | | 709/206 |
| 2010/0030715 | A1* | 2/2010 | Eustice | G06Q 10/10 |
| | | | | 706/12 |
| 2010/0161369 | A1* | 6/2010 | Farrell | G06Q 50/01 |
| | | | | 705/319 |
| 2010/0223581 | A1* | 9/2010 | Manolescu | G06Q 10/00 |
| | | | | 715/853 |
| 2011/0167115 | A1* | 7/2011 | Gilbert | G06Q 10/00 |
| | | | | 709/204 |
| 2011/0184772 | A1* | 7/2011 | Norton | G06Q 10/1093 |
| | | | | 705/7.18 |
| 2012/0210429 | A1* | 8/2012 | Stute | C12Q 1/6804 |
| | | | | 726/23 |
| 2012/0290565 | A1* | 11/2012 | Wana | G06F 16/958 |
| | | | | 707/723 |
| 2012/0290950 | A1* | 11/2012 | Rapaport | H04L 51/32 |
| | | | | 715/753 |
| 2013/0041653 | A1* | 2/2013 | Tseng | G06Q 50/01 |
| | | | | 704/9 |
| 2013/0097180 | A1* | 4/2013 | Tseng | G06F 16/955 |
| | | | | 707/748 |
| 2013/0191372 | A1* | 7/2013 | Lee | G06F 16/9024 |
| | | | | 707/722 |
| 2013/0191416 | A1* | 7/2013 | Lee | G06F 16/24534 |
| 2013/0198203 | A1* | 8/2013 | Bates | G06Q 30/02 |
| | | | | 707/748 |
| 2013/0204658 | A1* | 8/2013 | Yogev | G06Q 30/0201 |
| | | | | 705/7.29 |
| 2013/0226910 | A1* | 8/2013 | Work | G06Q 10/00 |
| | | | | 707/722 |
| 2014/0025702 | A1* | 1/2014 | Curtiss | G06Q 50/01 |
| | | | | 707/769 |
| 2015/0074020 | A1* | 3/2015 | Arpat | G06N 5/04 |
| | | | | 706/12 |
| 2015/0205842 | A1* | 7/2015 | Jain | G06Q 10/10 |
| | | | | 707/732 |
| 2015/0242910 | A1* | 8/2015 | Ramasubramanian | |
| | | | | G06Q 30/0283 |
| | | | | 705/35 |
| 2015/0278909 | A1* | 10/2015 | Bax | G06Q 30/0631 |
| | | | | 705/26.7 |
| 2015/0379131 | A1* | 12/2015 | Gurevich | G06F 16/24578 |
| | | | | 707/723 |
| 2016/0241505 | A1* | 8/2016 | Hermsdorff | G06Q 10/1053 |
| 2016/0328681 | A1* | 11/2016 | Portnoy | G06Q 50/01 |
| 2017/0012913 | A1* | 1/2017 | Lohani | H04L 67/306 |
| 2017/0236081 | A1* | 8/2017 | Grady Smith | G06Q 10/067 |
| | | | | 705/7.36 |
| 2019/0066231 | A1* | 2/2019 | Dixit | G06N 7/005 |

OTHER PUBLICATIONS

Stephen J.H. Yang, Irene Y.L. Che et al. (A social network-based system for supporting interactive collaboration in knowledge sharing over peer-to-peer network, ScienceDirect, 2008). (Year: 2008).*

Jennifer Golbeck and James Hendler et al. (Inferring Binary Trust Relationships in Web-Based Social Networks, ACM Transactions on Internet Technology, vol. 6, No. 4, Nov. 2006, pp. 497-529). (Year: 2006).*

* cited by examiner

SYSTEMS AND METHODS FOR PRIVACY-PRESERVING ENABLEMENT OF CONNECTIONS WITHIN ORGANIZATIONS

BACKGROUND OF THE INVENTION

1. Field of the Invention

Embodiments disclosed herein generally relate to systems and methods for privacy-preserving enablement of connections within organizations.

2. Description of the Related Art

Social networks are often mined to identify connections that members of an organization may have with a business target. For example, an organization may use social networking to identify relationships between employees and potential business partners (e.g., targets).

SUMMARY OF THE INVENTION

Systems and methods for privacy-preserving enablement of connections within organizations are disclosed. In one embodiment, a method may include (1) receiving, at a server comprising a computer processor, an identification of a target to contact from a requester in an organization; (2) the computer processor identifying, in a connection database, at least one user within the organization having a connection with the target; (3) the computer processor communicating anonymized information representing the at least one user having the connection and a relationship-strength score for the connection; (4) the computer processor communicating a request for introduction assistance to the at least one user; (5) the computer processor receiving acceptance of the request for introductory assistance from the at least one user; and (6) the computer processor identifying the at least one that accepted the request to the requester.

In one embodiment, the relationship-strength score may be based on a plurality of electronic records between the target and the at least one user. The electronic records may include electronic messages, electronic calendar entries and phone records, social media records, etc.

In one embodiment, the relationship-strength score may also be based on at least one of a number of electronic records exchanged between the target and the at least one user; the recency of the electronic records exchanged between the target and the at least one user, and an importance of the electronic records exchanged between the target and the at least one user. The importance may be determined by, for example, natural language processing.

In one embodiment, the method may further include the computer processor automatically scheduling a meeting between the requester and the at least one user that accepted the request based on electronic calendars for the requester and the at least one user that accepted the request.

In one embodiment, the privacy of the at least one user having the connection may be preserved until the user accepts the request.

According to another embodiment, a system for identifying an anonymous connection with a target may include a server comprising a computer processor; a database comprising a plurality of connections between targets and users within an organization; and a requester interface that receives an identification of a target to contact from a requester in an organization. The computer processor may: (a) receive, from the requester interface, the identification of the target; (b) identify, from the connection database, at least one user within the organization having a connection with the target; (c) communicate anonymized information representing the at least one user having the connection and a relationship-strength score for the connection to the requester interface; (d) communicate a request for introduction assistance to the at least one user; (e) receive acceptance of the request for introductory assistance from the at least one user; and (d) identify the at least one user that accepted the request to the requester interface.

In one embodiment, the relationship-strength score may be based on a plurality of electronic records between the target and the at least one user. The electronic records may include electronic messages, electronic calendar entries and phone records, social media records, etc.

In one embodiment, the relationship-strength score may also be based on at least one of a number of electronic records exchanged between the target and the at least one user; the recency of the electronic records exchanged between the target and the at least one user, and an importance of the electronic records exchanged between the target and the at least one user. The importance may be determined by, for example, natural language processing.

In one embodiment, the computer processor may automatically schedule a meeting between the requester and the at least one user that accepted the request based on electronic calendars for the requester and the at least one user that accepted the request.

In one embodiment, the privacy of the at least one user having the connection may be preserved until the user accepts the request.

According to another embodiment, a method for identifying anonymous connections with a target may include (1) a server comprising a computer processor receiving a plurality of electronic records; (2) the computer processor extracting metadata from the electronic records to identify sending parties and receiving parties, wherein for each electronic record, one of the sending party and the receiving party comprises one of a plurality of targets, and the other party is one of a plurality of members of an organization; (3) the computer processor determining a relationship-strength score between the each target and each member of the organization; and (4) the computer processor graphically representing the relationship between at least one of the targets and at least one of the members of the organization based on the relationship-strength score.

In one embodiment, the electronic records comprise electronic messages, electronic calendar entries, phone records, social media records, etc.

In one embodiment, the relationship-strength score may be based on at least one of a number of electronic records exchanged between the target and the member, the recency of the electronic records exchanged between the target and the member, and an importance of the electronic records exchanged between the target and the member. The importance may be determined by, for example, natural language processing.

In one embodiment, the method may further include the computer processor graphically representing at least one gap in a relationship with a target.

In one embodiment, the privacy of the members of an organization may be preserved.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF PREFERRED EMBODIMENTS

Embodiments relate to systems and methods for privacy-preserving enablement of connections within organizations.

Disclosed herein are systems and for identifying anonymous connections with targets. Embodiments may facilitate a warm introduction to a business target while preserving the privacy of some or all of the individuals involved. For example, the identity of an internal individual having a connection with a target may not be revealed until that individual has accepted an invitation to make the introduction to the target. Thus, that individual may not feel pressured to accept the invitation.

Figure 1:
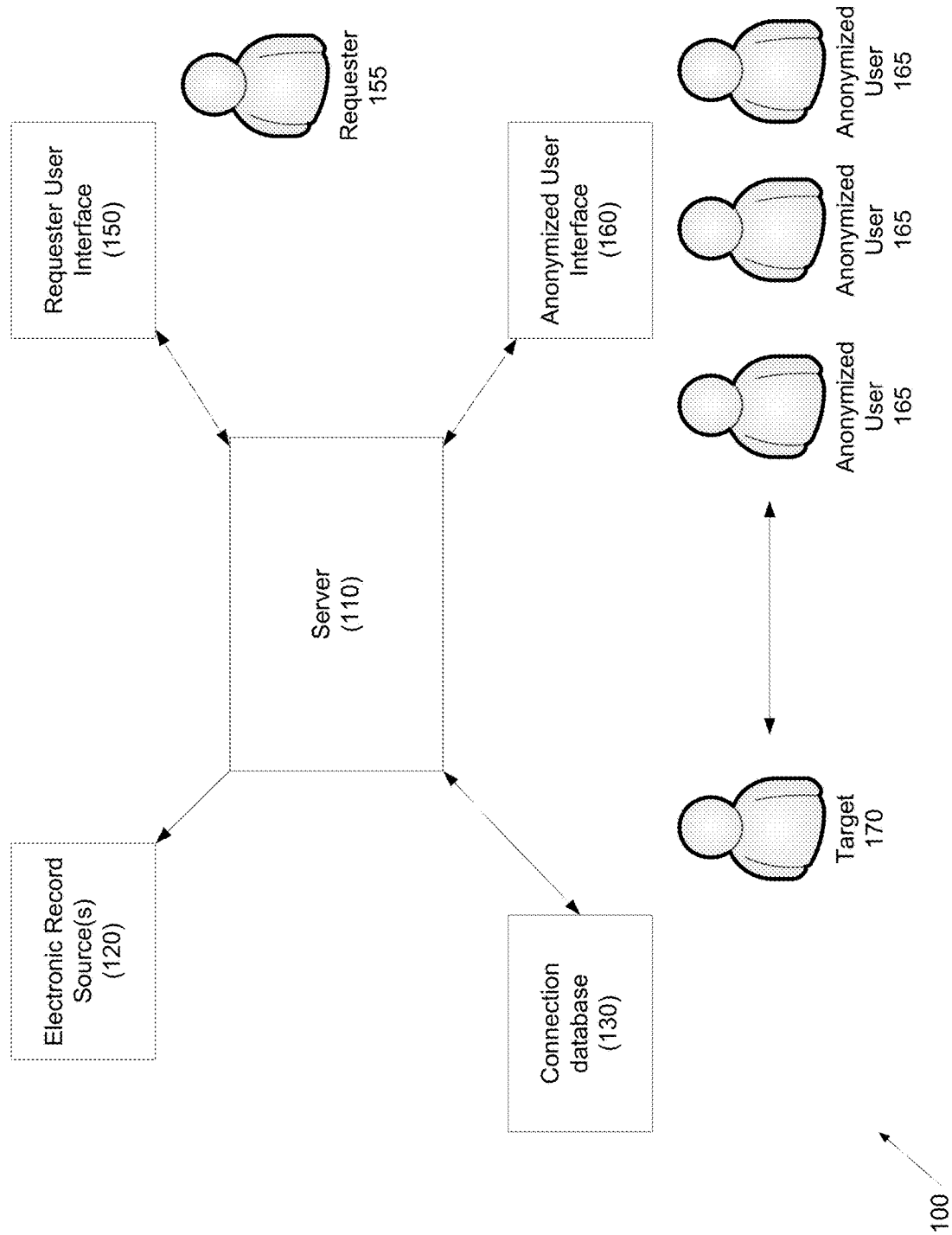
FIG. 1 depicts a system for the privacy-preserving enablement of connections within an organization according to one embodiment.

Referring to FIG. 1, a system for the privacy-preserving enablement of connections within an organization is disclosed according to one embodiment. System 100 may include server 110, which may execute one or more computer program for identifying and managing connections. System 100 may further include one or more electronic record source 120, which may interface with server 110. Electronic records source(s) 120 may include internal electronic record sources (e.g., electronic message systems, address books, calendars, client lists, marketing databases, phone logs, etc.) and external electronic record sources (e.g., text messaging (e.g., SMS, MMS) databases, instant message chat records, social media sites (e.g., Twitter, Facebook, LinkedIn), social messaging services (e.g., Facebook Messenger), company home pages, school lists, alumni groups, professional organizations, 10K filings, etc.

In one embodiment, system 100 may further include one or more connection database 130 with which server 110 may interact. Connection database 130 may store metadata extracted from electronic record from electronic record source(s) 120.

System 100 may further include Requester User Interface 150 with which Requester 155 may interact. For example, Requester 155 may submit an identification of Target 170 to server 110 via Requester User Interface 150.

In one embodiment, Requester User Interface 150 may be provided on any suitable electronic device, including smart phones, tablet computers, desktop computers, workstations, Internet of Things appliances, etc.

System 100 may further include one or more Anonymized User Interface 160 for interfacing with Anonymized Users 165 that may also be provided on any suitable electronic device. In one embodiment, following a request, Requestor 155 may be informed of a connection between Target 170 and one or more Anonymized Users 165. Anonymized Users 165 may be presented with a request for assistance in facilitating an introduction between Requestor 155 and Target 170, and may accept or reject that request. In one embodiment, the identity of Anonymized User 165 may not be disclosed to Requestor 155 until after Anonymized User 165 accepts the request.

Target 170 may be an individual, an organization, etc. with which one or more Anonymized User 165 may have a connection, such as a social connection, a business connection, a family relationship, etc. In one embodiment, the connection may be a direct connection (e.g., Anonymized User 165 is directly connected to Target 170). In another embodiment, the connection may be an indirect connection (e.g., Anonymized User 165 is connected to Target 170 via a third party).

Figure 2:
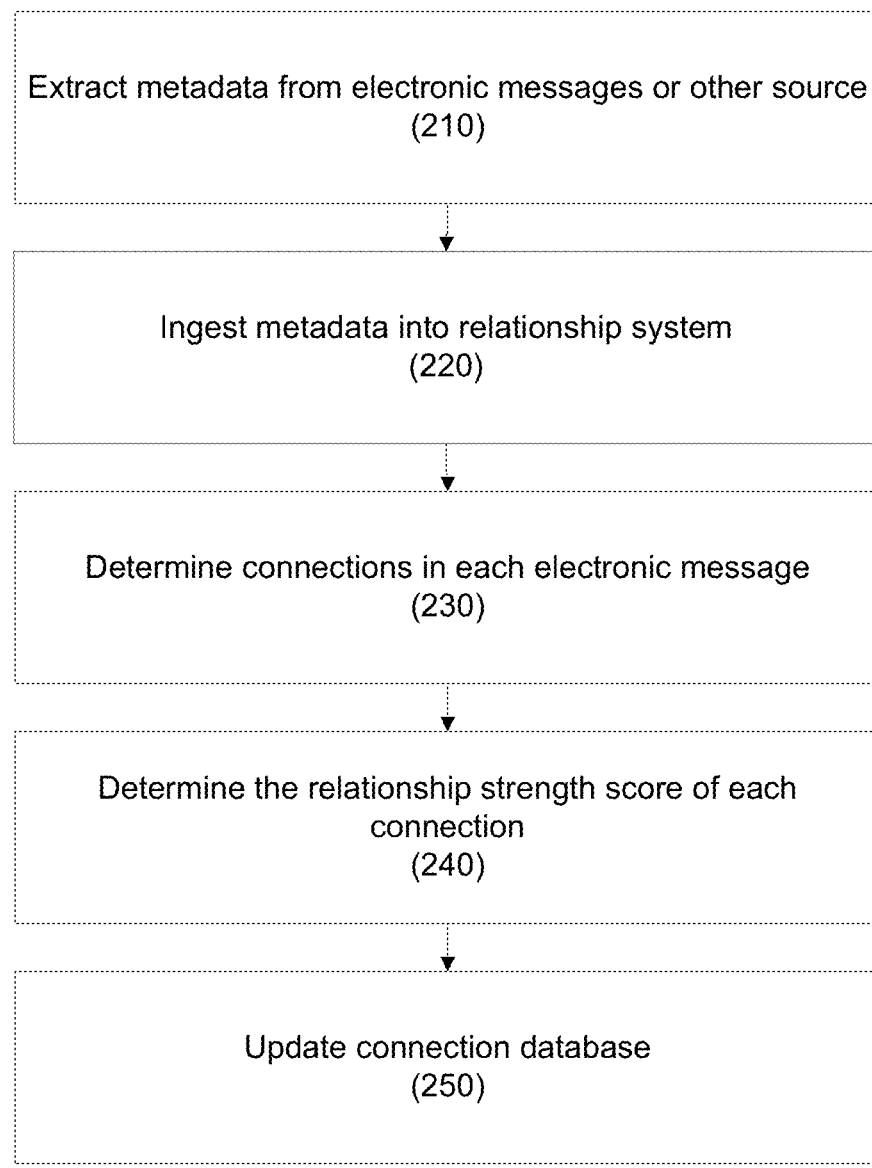
FIG. 2 depicts a method for identifying anonymous connections within an organization according to one embodiment.

Referring to FIG. 2, a method for identifying anonymous connections with targets is disclosed according to one embodiment.

In step 210, electronic records, such as internal electronic records and external electronic records (discussed above), may be received and metadata from the electronic records may be extracted. In one embodiment, the system may review electronic records substantially in real-time (e.g., review all incoming and outgoing electronic messages) or may review the electronic records periodically (e.g., electronic messages that may be stored in a repository on a nightly basis, weekly basis etc.).

In one embodiment, the metadata may include an identification of the parties (e.g., the sender and receiver of an electronic message, the parties to a calendar meeting request, etc.), the date and/or time of the electronic records (e.g., the electronic message was sent/received, the date and/or time of the meeting), etc. In one embodiment, the organization with which the sender or receiver is associated with, and the position within that organization, may be also identified. In one embodiment, the system may identify the parties that are internal to the organization, and those that are external to the organization.

In step 220, the metadata may be ingested into the relation system. In one embodiment, this metadata may be linked to the identity of an individual or a company.

In step 230, a relationship-strength score for each connection may be determined and/or updated. In one embodiment, the relationship-strength score may be weighted based on different factors. The relationship-strength score may be based on the number of data exchanges involving both parties to the connection (e.g., the number of electronic messages between the parties); the identification of the initiator of the electronic record (e.g., the sender of the electronic message, the meeting organizer); the temporal aspect of the electronic record (e.g., how recent), etc. For example, a large number of electronic messages may be weighted differently than a small number of electronic messages; an electronic message that is received from an external party may be weighted differently from a message that is sent to an external party; more recently electronic messages may be weighted differently from older electronic messages; etc. In one embodiment, additional factors (e.g., time of day, the use of other communication channels, the sender's domain (e.g., an email address from the senders employer's email system may be weighted differently from an email sent from a gmail account), etc.

Other weighting factors, including tone, sentiment, etc. may be inferred using, for example, natural language processing, keyword processing, etc., and may be applied to the relationship-strength score.

In step 250, the relationship-strength score may be saved or updated in, for example, a database.

Figure 3:
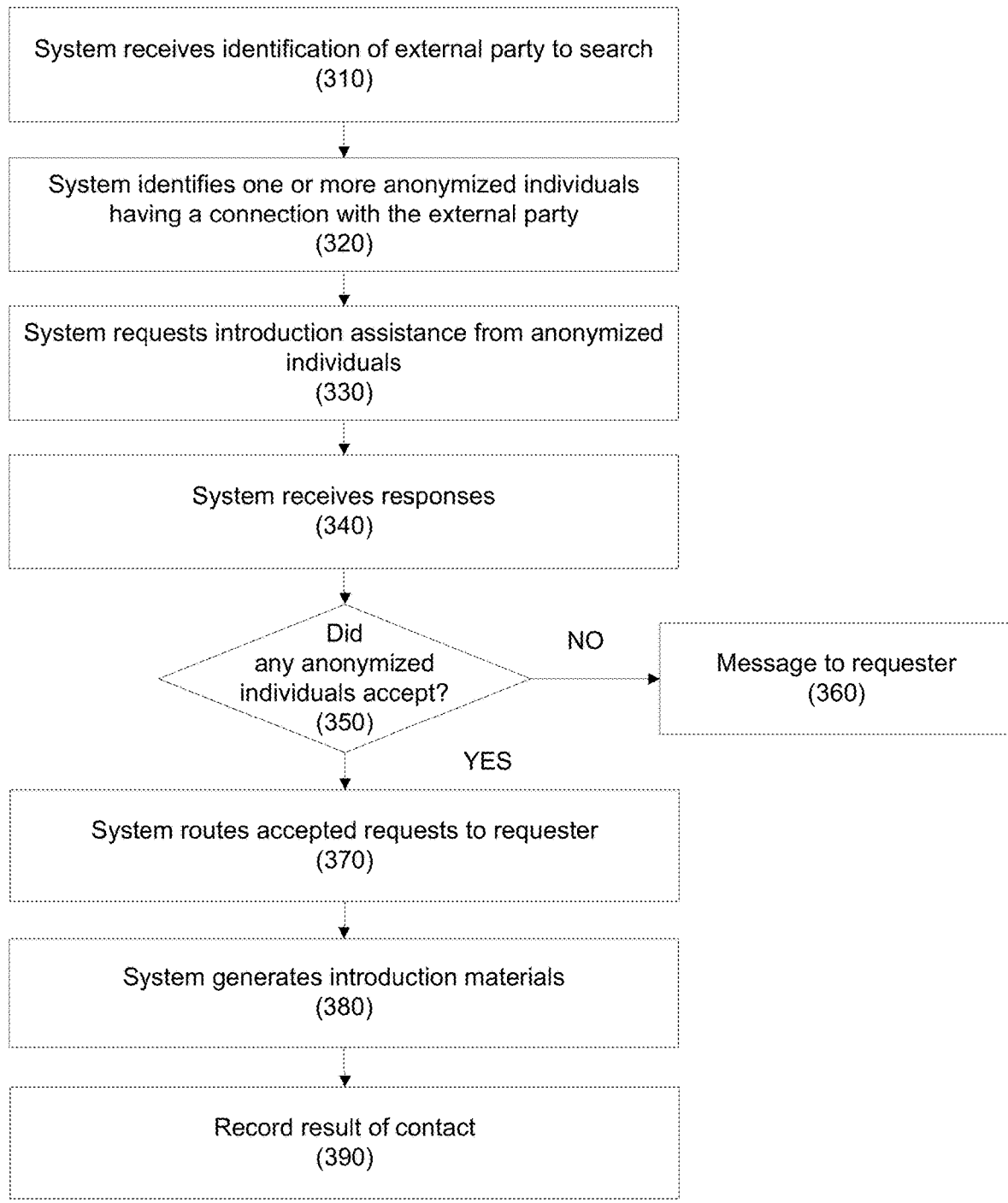
FIG. 3 depicts a method for identifying an anonymous connection with a target according to one embodiment.

Referring to FIG. 3, for identifying an anonymous connection with a target is disclosed according to one embodiment.

In step 310, a requester may submit a request for an identification of a connection with a target. In one embodiment, the requester may identify a specific individual (e.g., John Smith at XYZ Corp.), a specific position at an organization (e.g., the CIO of XYZ Corp.), or the organization itself (e.g., anyone at XYZ Corp.).

In one embodiment, the requester may provide a justification for the request, such as a business reason, a business plan proposal, etc.

In step 320, the system may query a connections database to identify one or more connections that internal parties may have with the target. The query may return one or more connections between an internal party and the target. The query may further return a relationship-strength score for the connection.

In one embodiment, the system may rank the connections based on their relationship-strength score. In one embodiment, a default weighting may be used to weight the relationship strength. In another embodiment, the requester may customize the weighting as required. For example, if the requester is only looking for targets with recent communications, those connections may receive a higher ranking than others.

In one embodiment, the identity of the internal parties having the connections may be anonymized, and the requester may simply be informed of the existence of the connection. In one embodiment, the requester may be provided with the relationship-strength score of each connection.

In step 330, for some or all of the internal parties, the system may communicate a request for assistance message by, for example, electronic mail. In one embodiment, the request for assistance message may identify the requester, any parameters associated with the request (e.g., organization, position, custom weighting, etc.), etc. In one embodiment, the request for assistance message may include the ability for the internal party to accept or decline the request.

In another embodiment, instead of the request for assistance being provided to all internal parties, the requester may receive a list of anonymized internal parties with their relationship-strength score. In one embodiment, details of the connection (e.g., name/title of external connection, length of connection, connection strength, etc.) may be provided as is necessary and/or desired. The requester may identify one or more internal party for the system to contact, and the request for assistance may only be provided to those internal parties.

In step 340, the system may receive responses from the internal parties that received the request for assistance. In one embodiment, the requests may be time-limited, so that if a request is not accepted within a predetermined amount of time, the request may be deemed expired.

If, in step 350, no anonymized individuals accepted the invitation, in step 360, the user may be informed that there are no contacts with the external party. In one embodiment, to maintain anonymity, the requester may not be informed that there was a connection that did not accept request for introduction assistance.

In one embodiment, the system may suggest other contact approaches, such as indirect contacts, as is necessary and/or desired.

In step 370, the requester may be provided with a list of non-anonymized internal parties that accepted the request for assistance. In one embodiment, details of the connection (e.g., name, position, relationship-strength score, length of connection, etc.) may be provided Thus, the privacy of the internal parties may be preserved until they accept the request for assistance.

In step 380, the requester may select one or more internal parties to contact the target, and the system may generate introductory materials for the internal party to send to the selected internal connection. In another embodiment, the system may automatically generate a calendar invite for the requester and the selected internal party to discuss the connection based on, for example, calendar availability, urgency of the request, etc.

In step 390, the system may record the results of the connection (e.g., success/fail, timing, etc.) for future reference and weighting. For example, if the external party did not respond, or was otherwise not helpful, this may be considered in further requests.

In another embodiment, they system may not inform the requester of the existence of any connections until after one or more connection has accepted the request for assistance. Thus, the requester may not receive an initial list of anonymized internal parties, but may instead receive a list of internal parties and relationship strength scores for the internal parties that accepted the request for assistance. The requester may then select one or more internal party to make the introduction.

In one embodiment, relationships between individuals within an organization and an organization of interest may be presented in graph form. For example, a graph may be provided with nodes indicating the connections, and edges indicating the connections. The edges may be depicted according to the relationship-strength score.

Figure 4:
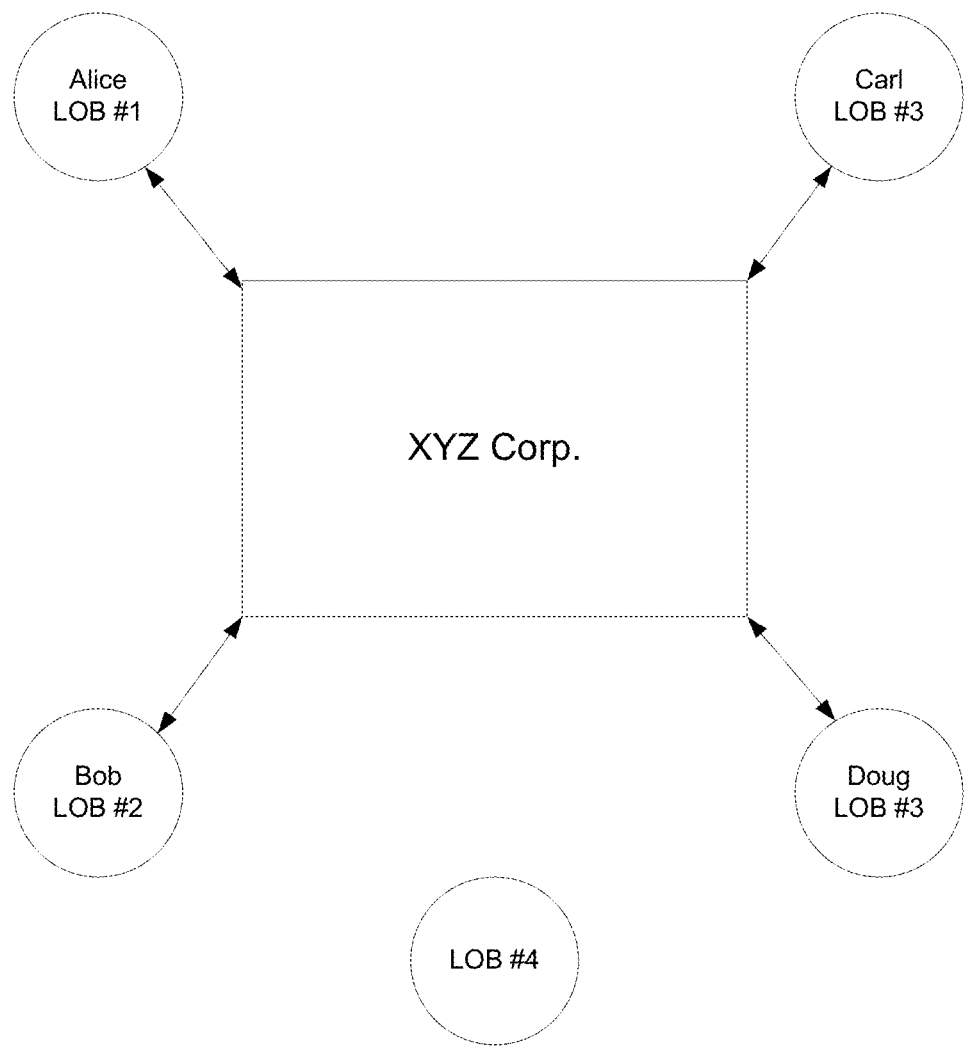
FIG. 4 depicts a graphical representation of connections according to one embodiment.

An example of a graphical connection is depicted in FIG. 4. For example, FIG. 4 depicts an exemplary holistic view of connections with a target (XYZ Corp.) and individuals (e.g., Alice, Bob, Carl, Doug) within an organization. In one embodiment, the line of business for each connection (e.g., LOB #1, LOB #2, LOB #3) may be identified.

In one embodiment, the identities of Alice, Bob, and Carl may be anonymized, and only the existence of the connection may be provided. Thus, the privacy of these individuals may be maintained.

In one embodiment, connection gaps may further be identified. For example, in FIG. 4, LOB #4 does not have a connection with XYZ Corp. This may suggest an opportunity for LOB #4 to seek an introduction with XYZ Corp. through Alice, Bob, Carl, or Doug, (the identities of which may be anonymized).

The disclosures of U.S. Patent Application Ser. Nos. 62/293,528 13/972,388; and 13/972,743 are hereby incorporated by reference in their entireties.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identifying an anonymous connection with a target, comprising:
    receiving, at a voice recognizer executed by a computer processor, a voice input regarding the operation of the computer processor, wherein the voice input comprises a request for an anonymous introduction to a target from a requester in an organization;
    in response to the voice input, the computer processor searching metadata in a connection database to identify a plurality of users within the organization that have a connection with the target, the connection database comprising metadata extracted from electronic messages between the plurality of users in the organization and the target, wherein the target is a sender or a recipient of the electronic messages;
    the computer processor inferring a sentiment or tone for each of the electronic messages using natural language processing;
    the computer processor calculating a relationship-strength score for each of the plurality of users and the target based on a number of electronic messages between each of the plurality of users and the connection, a recency of the electronic messages, and the sentiment or tone of the electronic messages;
    the computer processor communicating anonymized information representing each of the plurality of users having the connection and the relationship-strength score for the connection between the user and the target to the requester;
    the computer processor receiving a selection of one of the plurality of users;
    the computer processor communicating an anonymous request for introduction assistance to the selected user;
    the computer processor receiving acceptance of the anonymous request for introduction assistance from the selected user;
    the computer processor identifying the selected user that accepted the anonymous request for introduction assistance to the requester and identifying the requester to the selected user that accepted the anonymous request for introduction assistance; and
    the computer processor automatically scheduling a meeting between the requester and the selected user that accepted the request based on electronic calendars for the requester and the selected user that accepted the request.

2. The method of claim 1, wherein the electronic messages comprises social media communications.

3. The method of claim 1, wherein the relationship-strength score is further based on an importance of the electronic messages between the target and the one user.

4. A system for identifying an anonymous connection with a target, comprising:
- a server comprising a computer processor;
- a connection database comprising metadata extracted from electronic messages between a plurality of users in an organization and the target, wherein the target is a sender or a recipient of the electronic messages; and
- an electronic device executing comprising a voice recognizer;

wherein:
- the voice recognizer is configured to receive a voice input regarding the operation of the computer processor, the voice input comprising a request for an anonymous introduction to the target;
- in response to the voice input, the computer processor is configured to search the connection database to identify a plurality of users within the organization that have a connection with the target;
- the computer processor is configured to infer a sentiment or tone for each of the electronic messages using natural language processing;
- the computer processor is configured to calculate a relationship-strength score for each of the plurality of users and the target based on a number of electronic messages between each of the plurality of users and the connection and a recency of the electronic messages, a recency of the electronic messages, and the sentiment or tone of the electronic messages;
- the computer processor is configured to communicate anonymized information representing each of the plurality of users having the connection and the relationship-strength score for the connection between the user and the target to the requester interface;
- the computer processor is configured to receive a selection of one of the plurality of users;
- the computer processor is configured to communicate an anonymous a request for introduction assistance to the selected user;
- the computer processor is configured to receive acceptance of the request for introductory assistance from the selected user;
- the computer processor is configured to identify the selected user that accepted the anonymous request for introduction assistance to the requester interface and to identify the requester to the selected user that accepted the anonymous request for introduction assistance; and
- the computer processor is configured to automatically schedule a meeting between the requester and the selected user that accepted the request based on electronic calendars for the requester and the selected user that accepted the request.

5. The system of claim 4, wherein the electronic messages comprises social media communications.

6. The system of claim 4, wherein the relationship-strength score is further based on an importance of the electronic messages between the target and the selected user.

7. The system of claim 4, wherein the computer processor is further configured to automatically schedule a meeting between the requester and the selected user that accepted the request based on electronic calendars for the requester and the selected user that accepted the request.

\* \* \* \* \*